United States Patent [19]

Mendel et al.

[11] 4,433,917
[45] Feb. 28, 1984

[54] RESIN CATALYZATION CONTROL SYSTEMS

[75] Inventors: Jack M. Mendel, Chester; Carl C. Bomgardner, Middletown, both of N.Y.; Robert W. Rack, Ramsey, N.J.; Donald G. Scott, Cornwall; August W. Stritmater, Sloatsburg, both of N.Y.

[73] Assignee: International Paper Company, New York, N.Y.

[21] Appl. No.: 371,357

[22] Filed: Apr. 23, 1982

[51] Int. Cl.³ .......................... B01F 3/08; B01F 15/02
[52] U.S. Cl. .................................... 366/132; 366/141; 366/152
[58] Field of Search ............... 366/141, 142, 152, 153, 366/154, 160, 162, 179, 177, 16, 18, 19, 29, 132; 222/58, 63; 137/403, 407

[56] References Cited

U.S. PATENT DOCUMENTS

| | | | |
|---|---|---|---|
| 2,343,454 | 3/1944 | Harnett | 366/141 |
| 2,712,203 | 7/1955 | Green | 366/141 |
| 3,329,311 | 7/1967 | Goff et al. | 222/1 |
| 3,495,808 | 2/1970 | Klein et al. | 259/8 |
| 3,599,600 | 8/1971 | Carleton et al. | 118/8 |
| 3,605,682 | 9/1971 | Groce et al. | 118/7 |
| 3,608,869 | 9/1971 | Woodle | 366/177 X |
| 3,620,915 | 11/1971 | Keyes et al. | 162/253 |
| 3,707,859 | 1/1973 | Carr et al. | 68/202 |
| 3,876,106 | 4/1975 | Powell et al. | 222/57 |
| 3,877,682 | 4/1975 | Moss | 259/7 |
| 3,924,780 | 12/1975 | Elsworth | 222/64 |
| 4,053,353 | 10/1977 | Leffler | 162/198 |
| 4,135,006 | 1/1979 | Readal et al. | 427/10 |
| 4,263,932 | 4/1981 | Laar et al. | 137/101.27 |
| 4,265,858 | 5/1981 | Crum et al. | 366/152 X |
| 4,272,761 | 6/1981 | Newman | 340/500 |
| 4,272,824 | 6/1981 | Lewinger et al. | 366/141 X |
| 4,292,575 | 9/1981 | Frissora | 73/302 |
| 4,301,510 | 11/1981 | Ricciardi et al. | 364/567 |
| 4,301,944 | 11/1981 | Lestradet | 222/55 |
| 4,353,482 | 10/1982 | Tomlinson et al. | 366/152 X |

*Primary Examiner*—Philip R. Coe
*Attorney, Agent, or Firm*—Penelope A. Smith

[57] ABSTRACT

An apparatus for automatically preparing a multi-ingredient mixture in batches in a mixing tank and providing a continuous supply of the mixture to a run tank in response to down stream demand. Gravimetric means provide monitoring signals indicative of the actual weight of the contents of each tank. Deviations from target ingredient ratios are automatically registered and compensated for in preparing each batch by logic control means which compare the actual weight of each ingredient added with a precalculated target weight, calculate target weights for the second and subsequently added ingredients on the basis of the actual amounts of ingredients added earlier and automatically activate the mixing tank outlet valve and the ingredient supply valves.

11 Claims, 1 Drawing Figure

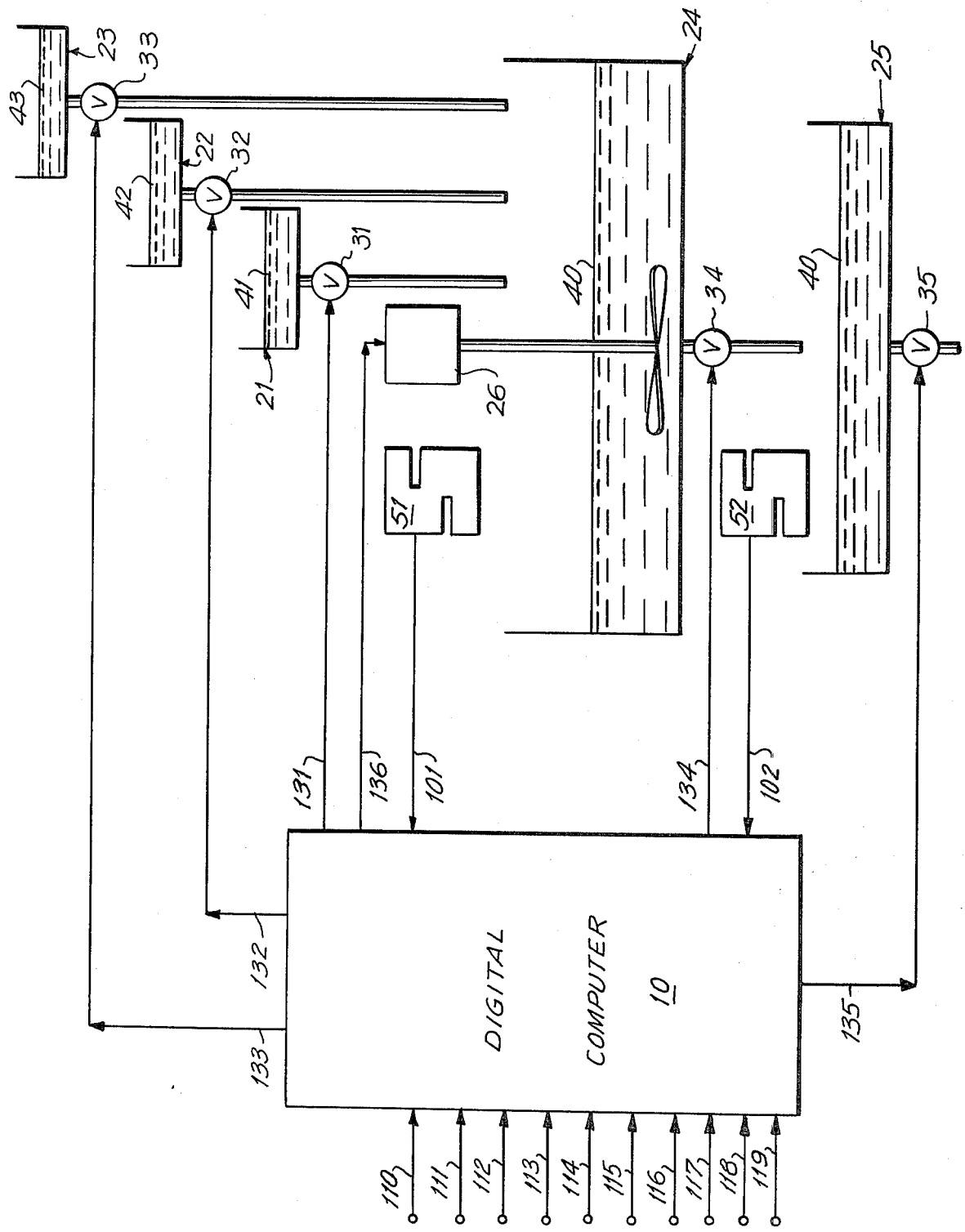

RESIN CATALYZATION CONTROL SYSTEMS

BACKGROUND OF THE INVENTION

This invention relates generally to an apparatus for automatically preparing batches of a mixture containing several ingredients, and more particularly to an apparatus for automatically catalyzing and supplying resinous coatings for paperboard.

Coating, dipping and related operations are generally most efficient and cost-effective when done as continuous, on-line processes. Thus, efforts have been made to develop machines for automatically mixing ingredients and providing continuous supplies of coating to the line. In the case of resinous coatings for paperboard, this has been particularly difficult. Resinous coatings are extremely corrosive and will rapidly destroy any delicate mechanisms such as sensors which are in regular contact with the coating or its various components. Moreover, once the resinous coating is mixed its viscosity increases rapidly and it will harden into a glassy, unmanageable mass if left standing for any appreciable period. Even where this is not allowed to happen, deposits of hardened resin will tend to accumulate on the sides of the supply apparatus, creating shadow-readings on level probes and other sensors which operate by direct contact, and also rapidly clogging any bottlenecks, such as pipe bends or metering valves, in the apparatus. Thus it will be seen that a metered mix-control system such as the one described in U.S. Pat. No. 3,620,915 issued Nov. 16, 1971 to Keyes, IV et al, which requires contacting sensors and metering valves for flow control, would be unsuitable for use with resinous coatings.

The relative proportions of the ingredients in a resinous coating must be carefully controlled. For example, the catalyst rarely represents more than a few percent of the total solids content of the coating, but the addition of too much catalyst may cause the coating to solidify in the pipes of the supply system while the addition of too little may result in an unacceptably tacky coated web. While a resinous coating need contain only three ingredients, i.e. a concentrated resin, a catalyst, and water, small amounts of other ingredients such as defoamers, wetting agents, viscosity and pH modifiers, curing agents and scavengers are often added and it is desireable to be able to precisely control the amounts added, both to achieve optimum results and to control the costs of what are generally expensive ingredients.

SUMMARY OF THE INVENTION

Thus, it is an object of this invention to provide an automatic mixing apparatus which can detect and accurately control the addition of both very large and very small amounts of ingredients.

It is yet another object to provide an apparatus which is not susceptible to corrosion or clogging.

It is yet another object to provide an apparatus which will automatically sense and respond to downstream resin demand so as to insure a continuous coating supply at the applicator.

It is still another object to provide an apparatus capable of automatically correcting for deviations from the target amounts for critical ingredients so as to maintain correct overall ingredient ratios.

Briefly, the present invention is an apparatus and method for preparing a mixture, such as a resinous coating, in batches and providing a continuous supply of the mixture at a feed station. Two or more ingredients are supplied from separate sources through separate selectively operable supply valve means to a mixing tank which may also contain or be connected to agitator means. Dumping means are provided for selectively emptying the mixing tank contents into a run tank. Each tank is connected to gravimetric means for providing a monitoring signal indicative of the weight of the tank contents. In the preferred embodiment, the monitoring signals are provided by suspending each tank from a load cell. Logic control means responsive to the monitoring signals are provided for selectively activating the supply valve means, the agitator means, and the dumping means. The control means include comparator means for comparing the actual weight of each ingredient added with a precalculated target weight and means for calculating the target weights of subsequently added or non-critical ingredients based on the actual added weights of previously added critical ingredients in order to maintain correct ingredient ratios.

OUTLINE OF DRAWING

For a better understanding of the invention, as well as other objects and further features thereof, reference is made to the following detailed description to be read in conjunction with the annexed drawing, whose single FIGURE is a block diagram showing a preferred embodiment of an automatic mixing apparatus in accordance with the invention.

DESCRIPTION OF THE PREFERRED EMBODIMENTS

Turning now to the drawing, an apparatus indicated generally by the reference numeral 20 has been depicted in schematic form. The apparatus includes a mixing tank, 24, and a run tank, 25, connected by a mixing tank valve, 34. The mixing tank chosen should be at least large enough to hold one batch of solution and the run tank large enough to hold one batch plus a reserve amount sufficient to satisfy demand while a fresh batch is being prepared. The batch size should be chosen on the basis of expected usage rate, large enough that short falls will not occur but not so large that the coating material will remain unused in the run tank for extended periods.

Ingredients are supplied to the mixing tank from two or more independently controllable sources. For the purposes of illustration, it will be assumed that the mixture being prepared, 40, is a catalyzed resin, and that it has three ingredients, 41, 42, and 43 which are, respectively, an undiluted resin, water, and a catalyst. Thus, undiluted resin, 41, may be supplied to mixing tank 24 from source 21 through resin supply valve 31. Catalyst 43 may be supplied from source 23 through catalyst supply valve 33 and water 42 may be supplied from source 22 through water supply valve 32. It should be understood, however, that while the apparatus of this invention is particularly well adapted for use with resinous coatings and other mixtures which are corrosive, quick-setting or both, it may be used for other mixtures as well.

It is an advantage of this invention that the apparatus may be used, with the addition of a suitable number of supply sources and valves, for mixtures having any number of ingredients. The ingredients may be supplied in almost any measurable form, as, for example, liquids, powders, granules, gasses, or extrudable gels. Moreover, the ingredients need not be added in identical forms. Thus, for example, a first ingredient might be supplied as a powder, a second as a liquid, and the third as a gel. And while means 31, 32, and 33 have been described as supply valves it will be obvious that other means of starting and cutting off the flow of an ingredient to the mixing tank may be appropriate and are also within the scope of the invention.

Means, 51, are provided for gravimetrically monitoring the contents of mixing tank 24. Similarly, means, 52, are provided for gravimetrically monitoring the contents of run tank 25. In the preferred embodiment illustrated in FIG. 1, these means are provided by suspending each tank from a load cell. Alternatively, each tank might rest upon a scale. Gravimetric monitoring means have two advantages over the more conventional level monitors. First, gravimetric monitors provide more accurate and reliable readings, particularly where small amounts are involved. This is particularly important where one ingredient, such as a catalyst, must be added in a quantity which is very small in proportion to the amounts of other ingredients. It also prevents waste. Second, gravimetric monitors, unlike level probes, are non-contacting sensors. Thus shadow readings caused by coating of the sensors will not occur nor will the gravimeter monitors be easily damaged by corrosive mixtures.

In the preferred embodiment, selectively operable agitator means, 26, for agitating the contents of mixing tank 40 are also provided.

Logic control means, 10, preferably in the form of a digital computer, are provided for selectively operating the supply valves, 31, 32, and 33 the agitator means, 26, and the mixing tank valve, 34. The computer receives a mixing tank monitoring signal, 101, from the mixing tank load cell, 51, and a run tank monitoring signal, 52, from the run tank load cell, 52. To provide essentially continuous monitoring, it is preferred that the load cells 51 and 52 be sensed and the current values of monitoring signals 101 and 102 be read into the computer several times a second. Less frequent sensing might be required if the tanks were filled and emptied rather slowly.

The computer, 10, also operates on a number of predetermined parameters. It is preferred that these parameters be manually input, so that they can be changed as the need arises, but the preset parameters might also be "burned in". In the preferred embodiment, the predetermined parameters are a prep request trigger level, 110, a run tank refill level, 111, a mixing tank abort level, 112, a batch size, 113, a received resin solids content, 114, a target resin solids content, 115, a received catalyst solids content, 116, a catalyst to resin solids ratio, 117, a minimum agitation time, 118, and a minimum settling time, 119.

The computer, 10, includes calculator means for calculating target ingredient weights based on the predetermined parameters and the actual weights of previously added ingredients as indicated by the mixing tank monitoring signal, 101. It also includes comparator means for comparing actual with target values, storage means and, preferably, a timer.

In the preferred embodiment, the control sequence is as described below. Prior to the initiation of the automatic resin preparation sequence, the computer calculates initial target weights for each ingredient based on the input values of predetermined parameters 113, 114, 115, 116, and 117. Letting $V_k$ be the value of predetermined parameter k, X be the resin target weight, Y the water target weight and Z the catalyst target weight, the computer calculates initial values for X, Y, and Z in accordance with the following algorithms:

$$X_i = \frac{V_{113}}{\frac{V_{114}}{V_{115}} + V_{117} \cdot \frac{V_{114}}{V_{116}}}$$

$$Y_i = \left(\frac{V_{114}}{V_{115}} - 1\right) X_i$$

$$Z_i = \left(\frac{V_{117} \cdot V_{114}}{V_{116}}\right) X_i$$

The target set sequence may be done automatically whenever a resin prep sequence is initialed, but it is preferred that the target set be done once when the apparatus is started up and thereafter be triggered only by a manually input change in the value of one of the predetermined parameters.

In the first run tank test mode, the initial state in the resin prep sequence, the logic control means, 10, compares the values of the run tank monitoring signal 102 and the predetermined prep request trigger level parameter 110. When the weight of the contents of the run tank falls below the predetermined trigger level, the computer, 10, closes mixing tank valve 34 by means of output signal 134. The computer 10, then compares the values of the mixing tank monitoring signal and the predetermined mixing tank abort level parameter 112. If the weight of the mixing tank contents exceeds the abort level, the apparatus shuts down and, preferably displays an appropriate warning signal. Otherwise the resin supply valve, 31, is opened by output signal 131. The computer then sets an initial target weight, $T_o$ equal to $X_i$, the previously calculated resin target weight. The computer then compares the values of the mixing tank monitoring signal 101 with $T_o$. When the weight of the mixing tank contents is at least as great as $T_o$ the resin supply valve is closed by output signal 131.

When valve 31 has been fully closed, the actual weight of the resin in the tank will be somewhat greater than the target weight $X_i$. This phenomenon is known as overshoot and is caused primarily by the finite closure time of valve 31, although signal lag time, the period between consecutive tests of mixing tank weight, and valve clogging may all be contributing factors. An important feature of this invention is that it provides automatic overshoot compensation. The key ingredient or ingredients are added first and the target weights for the other ingredients are then recalculated based on the actual added weights of the key ingredients so that critical ingredient ratios can be maintained within close tolerances. This automatic adjustment is believed to be a unique feature of the apparatus, not previously available in batch-type mixing apparatus.

When valve 31 is closed, the mixing tank is allowed to settle for predetermined minimum time (based on a comparison between a timer and predetermined settling time parameter 119), before the current value of the mixing tank monitoring signal 101 is read into the computer 10. This value will be $X_A$, the mixing tank. The computer then calculates a new target weight, $T_1$, based on the actual amount of resin added in accordance with the following algorithm:

$$T_1 = \left(\frac{Y_i}{X_i} + 1\right) X_A$$

Water supply valve, 32, is then opened by output signal, 132. The computer then compares the value of the mixing tank monitoring signal, 101, with $T_1$ and when the weight of the mixing tank contents is at least as great as $T_1$, the water supply valve is closed by output signal 132.

The computer 10, then activates the agitator means 26 by output signal 136 and the resin/water combination is agitated for a predetermined minimum time (based on a comparison between a timer and predetermined mixing time parameter 118). When this time is up, the agitator is turned off by output signal 136 and the mixing tank is again allowed to settle for the predetermined minimum settling time before the current value of the mixing tank monitoring signal is read into the computer. This value will be $X_A + Y_A$, the sum of the actual weights of resin and water added to the mixing tank. The computer then calculates a new target weight, $T_2$, based on this value in accordance with the following algorithm:

$$T_2 = \left(\frac{Z_i}{X_i} \cdot X_A\right) + X_A + Y_A$$

Catalyst supply valve, 33, is then opened by output signal, 133. The computer then compares the value of the mixing tank monitoring signal, 101, with $T_2$ and when the weight of the mixing tank contents is at least as great as $T_2$, the catalyst supply valve is closed by output signal 133.

The computer 10, then activates the agitator means 26 by output-signal 136 and the resin/water/catalyst combination is agitated for a predetermined minimum time (based on a comparison between a timer and predetermined mixing time parameter 118). When this time is up, the apparatus enters, the second run tank test mode. In this mode, the computer, 10 compares the values of the run tank monitoring signal, 102, and the run tank refill level parameter, 111. So long as the weight of the run tank exceeds this preset refill level, the mixing tank valve 34, will remain closed and agitator means 26 will be activated by signal 136 to prevent settling of the mixture in the run tank. When the weight of the run tank drops below this preset level, the agitator means will be turned off by signal 136 and mixing tank valve 34 will be opened by signal 134. Since the refill signal is never tested unless the resin is fully ready, there is no danger that a half-mixed batch will be dumped into the run tank.

While a preferred embodiment of the invention has been shown and described, it will be appreciated that various changes and modifications may be made therein without departing from the spirit of the invention.

For example, while certain predetermined parameters have been described in connection with the preferred embodiment, it will be obvious that others are also within the scope of the invention and that more or fewer than the number described may be used. Thus, if the mixing time were relatively short in comparison to the average time for depleting the run tank, a single request parameter might be used in place of prep request trigger level 110 and run tank refill level 111. On the other hand separate agitation times might be established for each step in the mixing process instead of a single minimum agitation time. And ingredient/batch weight target ratios may be used instead of target solids contents, or ingredient target weights may be input directly.

And while in the embodiment described the resin was the key ingredient to which both catalyst and water additions were targeted, it will be understood that an ingredient addition can be targeted to any earlier-added ingredient or combination of earlier added ingredients. Thus, for example, the catalyst might have been keyed to both the water and the resin actual weights in accordance with the following algorithm:

$$T_2 = \left(\frac{Z_i}{X_i + Y_i} + 1\right) X_A + Y_A$$

And a fourth ingredient, W, a water softener might be added on the basis of actual water usage only, in accordance with the following algorithm:

$$T_3 = \left(\frac{W_i}{Y_i} \cdot Y_A\right) X_A + Y_A + Z_A$$

These variations and others like them will be obvious to those skilled in the art.

What is claimed is:

1. An apparatus for preparing a mixture in batches and supplying it to a feed station comprising:
    a mixing tank;
    means for transferring the mixture from the mixing tank to the feed station;
    a first source for supplying a first ingredient of the mixture;
    a second source for supplying a second ingredient of the mixture;
    a first supply valve connecting the first source to the mixing tank;
    a second supply valve connecting the second source to the mixing tank;
    means for providing a mixing tank monitoring signal indicating the actual weight of the contents of the mixing tank;
    means for providing a "start prep" signal to initiate the mixture preparation; and
    logic control means responsive to the "start prep" signal and the mixing tank monitoring signal for opening and closing the first and second supply valves to sequentially add the first and second ingredients to the mixing tank in accordance with precalculated target weights, the control means including first calculator means responsive to the mixing tank monitoring signal for calculating a target weight for the second ingredient on the basis of the weight of the first ingredient actually added to the mixing tank.

2. An apparatus according to claim 1 further comprising a third source for supplying a third ingredient of the mixture; and
    a third supply valve connecting the third source to the mixing tank;

and wherein the logic control means further comprises second calculator means responsive to the mixing tank monitoring signal for calculating a target weight for the third ingredient on the basis of the weight of the first ingredient actually added to the mixing tank.

3. An apparatus according to claim 1 further comprising:
a third source for supplying a third ingredient of the mixture; and
a third supply valve connecting the third source to the mixing tank; and
wherein the logic control means further comprises second calculator means responsive to the mixing tank monitoring signal for calculating a target weight for the third ingredient on the basis of the weight of the second ingredient actually added to the mixing tank.

4. An apparatus according to claim 1 further comprising:
a third source for supplying a third ingredient of the mixture; and
a third supply valve connecting the third source to the mixing tank; and
wherein the logic control means further comprises second calculator means responsive to the mixing tank monitoring signal for calculating a target weight for the third ingredient on the basis of the weight of the first and second ingredients actually added to the mixing tank.

5. An apparatus according to claim 1 further comprising means for agitating the contents of the mixing tank; and
wherein the logic control means further comprises means responsive to the mixing tank monitoring signal for activating the agitating means for a predetermined period after the addition of each ingredient.

6. An apparatus for preparing a mixture in batches and supplying it to a run tank comprising:
a mixing tank;
a run tank;
means for transferring the mixture from the mixing tank to the run tank;
a first source for supplying a first ingredient of the mixture;
a second source for supplying a second ingredient of the mixture;
a first supply valve means connecting the first source to the mixing tank;
a second supply valve means connecting the second source to the mixing tank;
means for providing a mixing tank monitoring signal indicating the actual weight of the contents of the mixing tank;
means for providing a run tank monitoring signal indicating the actual weight of the contents of the run tank;
means responsive to the run tank monitoring signal for providing a "start prep" signal when the actual weight of the run tank contents falls below a first predetermined minimum weight; and
logic control means responsive to the "start prep" signal for sequentially:
defining a first target weight as a predetermined first ingredient weight,
opening the first supply valve means to allow the first ingredient to pass from the first source into the mixing tank,
closing the first supply valve means when the actual weight of the mixing tank contents is at least as great as the first target weight,
reading the first ingredient actual weight of the mixing tank contents from the mixing tank monitor,
defining a second target weight as a predetermined multiplier of the first ingredient actual weight,
opening the second supply valve means to allow the second ingredient to pass from the second source into the mixing tank, and
closing the second supply valve means when the actual weight of the mixing tank contents is at least as great as the second target weight.

7. An apparatus according to claim 6 wherein the apparatus further comprises:
means for agitating the contents of the mixing tank; and
wherein the logic control means further comprises means for activating the agitating means.

8. An apparatus according to claim 6 further comprising one or more additional sources for supplying one or more additional ingredients of the mixture; and
a valve means connecting each additional source to the mixing tank; and
wherein the logic control means further comprises means for adding each additional ingredient to the mixing tank in a predetermined sequence by defining a target weight for the additional ingredient as a predetermined algorithm based on the actual weights of the previously added ingredients, opening the valve means to allow the additional ingredient to pass from source to the mixing tank, and closing the valve means when the actual weight of the mixing tank contents is at least as great as the target weight.

9. An apparatus according to claim 6 wherein the mixing tank monitor and the run tank monitor are load cells.

10. An apparatus according to claim 6 wherein the means for transferring the mixture from the mixing tank to the run tank comprises:
a run tank valve means connecting the mixing tank to the run tank;
means for providing a "refill" signal when the actual weight of the run tank contents falls below a second predetermined minimum weight;
control means responsive to the "refill" signal for opening the run tank valve means to allow the mixture to pass from the mixing tank to the run tank.

11. An apparatus according to claim 6 wherein the logic control means is a digital computer.

* * * * *